United States Patent

Schaefer

[15] 3,700,834
[45] Oct. 24, 1972

[54] ELECTRICAL CABLE APPARATUS

[72] Inventor: Cyril L. Schaefer, P.O. Box 33, Potosi, Wis. 35820

[22] Filed: Feb. 10, 1971

[21] Appl. No.: 114,129

[52] U.S. Cl. ............................191/12.2 R, 174/52 R
[51] Int. Cl. .............................................H02g 11/00
[58] Field of Search .191/12.2 R, 12.4; 174/50, 52 R, 174/151; 285/192; 85/1 R

[56] References Cited

UNITED STATES PATENTS

| | | |
|---|---|---|
| 3,337,695 | 8/1967 | Brown .......................191/12.4 |
| 1,363,417 | 12/1920 | Hunt .................191/12.2 R X |
| 1,542,600 | 6/1925 | Boecher...................174/50 X |
| 1,172,406 | 2/1916 | Taylor..........................85/1 R |

Primary Examiner—Arthur L. La Point
Assistant Examiner—George H. Libman

[57] ABSTRACT

A device for attachment to service vehicles. This device consists of a hinged doored case, having on its interior a pair of reels with spring return means for the heavy duty electrical cables thereon. The cables, when extended, allow for the service vehicles battery and electrical system to supply a boosting current for starting stalled vehicles.

1 Claim, 3 Drawing Figures

PATENTED OCT 24 1972　　　　　　　　　　　　　3,700,834

INVENTOR.
CYRIL L. SCHAEFER

ELECTRICAL CABLE APPARATUS

This invention relates to electrical cable devices, and more particularly to electrical cable apparatus for service vehicles.

It is therefore the primary purpose of this invention to provide an electrical cable apparatus which will be secured to a service vehicle for enabling the operator to quickly service a stalled vehicle by applying a booster current to start the stalled vehicle particularly when the stalled vehicle's battery has failed.

Another object of this invention is to provide an apparatus of the type described which will be suitably mounted to the servicing vehicle, the arrangement being carried within a box having a hinged door, a lock, and a switch, the switch, when in the off position, serves to protect the electrical system of the servicing vehicle in the event someone tampers with the apparatus.

Another object of this invention is to provide a cable apparatus which will be secured by sleeve means passing through the box, the sleeve members also allowing the connecting cables from the reels of the apparatus to be carried therethrough for connection to the electrical system of the service vehicle.

A further object of this invention is to provide a cable apparatus which will have a pair of reels for the heavy duty electrical cable, the reels being spring loaded so as to return the cables onto the reels after a service operation.

A still further object of this invention is to provide an apparatus of the type described which will have guide means and stop means for the clips on the cables therefore to hold the clips stationary until they are needed again.

Other objects of this invention are to provide an electrical cable apparatus which is simple in design, inexpensive to manufacture, rugged in construction, easy to use and efficient in operation.

These and other objects will be readily evident upon a study of the following specification and the accompanying drawing, wherein.

Figure 1:
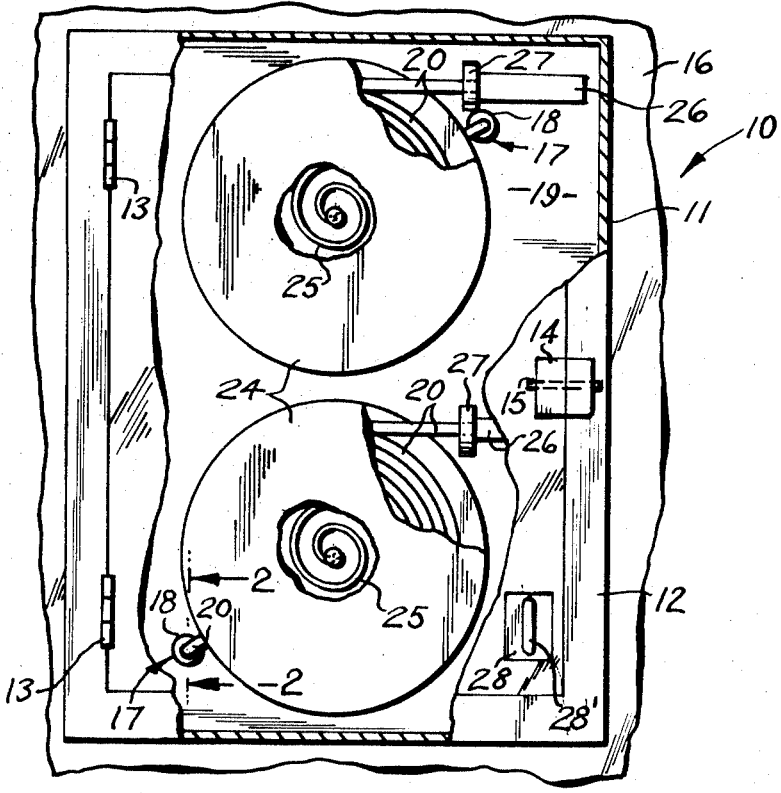
FIG. 1 is a front view of the present invention shown partly broken away.
Figure 2:
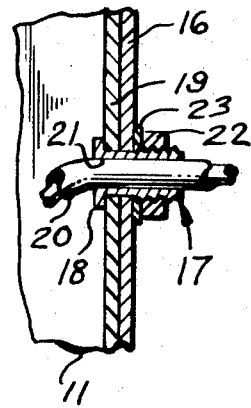
FIG. 2 is an enlarged cross-sectional view taken along the lines 2—2 of FIG. 1.
Figure 3:
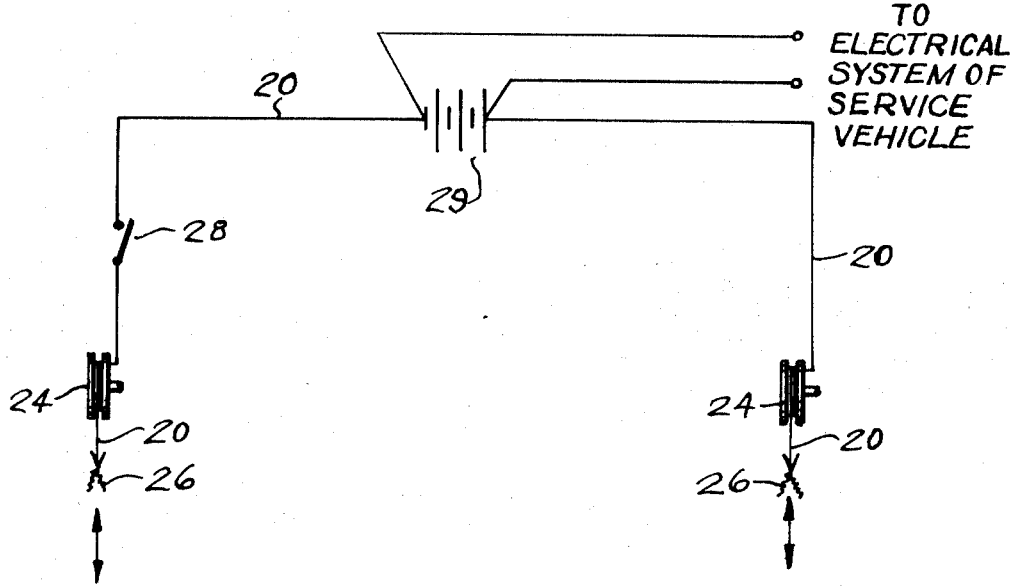
FIG. 3 is a schematic wiring diagram of the invention.

According to this invention, an electrical cable apparatus 10 for service vehicles, is shown to include a hollow rectangular shaped box 11 having a door 12 secured by means of a pair of hinges 13. Door 12 also includes a handle 14 which may receive a lock when apparatus 10 is not in use. A pin 15 may be inserted into handle 14 when apparatus 10 is in use. Box 11 is secured to the panel 16 of the service vehicle (not shown). Box 11 is secured to panel 16 by means of a pair of hollow and externally threaded sleeves 17, the sleeves 17 having a flange 18 which abuts with the back wall 19 of box 11. The heavy duty electrical cables 20 are carried through the bore 21 of sleeves 17 and sleeves 17 receive nut fasteners 22 and washers 23 to thus secure them and the box 11 to the vehicles panel 16. On the interior of box 11 are a pair of cables 20 carrying reels 24, the reels 24 having conventional internal and spiral convoluted springs 25 which serve to automatically rewind the cables 20, onto the reels 24. At one end of the cables 20 is secured heavy duty clamps 26 for connecting cables 20 to the stalled vehicles battery (not shown). A yoke member 27 fixedly secured to the back wall 19 of box 11 slidably carries the cables 20 and serves as stop means against the clamps 26 when cables 20 are retracted upon their respective reels 24. A switch 28 in series of one of the cables 20 provides an effective means of preventing an accident to the electrical system of the service vehicle, the cables 20 being electrically connected to the service vehicles battery 29 which in conjunction with the service vehicles alternator will supply a booster current to the stalled vehicles battery in order that its engine may be started.

In use, box 11 is unlocked and door 12 is opened by means of handle 14 and the cables 20 are withdrawn by the operator pulling the clamps 26, after which the operator properly connects the clamps 26 to the battery terminals of the stalled vehicle by means of handle 28'. The operator then closes the switch 28 which will allow current from the service vehicle battery 29 to be used as booster current to start the stalled vehicle. After the stalled vehicle is started, the operator holding the clamps 26 after their removal from the stalled vehicle's battery, and the springs 25 of reels 24 will automatically rewind cables 20 onto their respective reels 24. The operator then opens the switch 28 thus rendering the electrical system of the servicing vehicle safe and when cables 20 are fully withdrawn, the clamps 26 will abut with the members 27 thus preventing further travel thereof.

It shall be noted that box 11 may be installed in any desired location upon the service vehicle.

What I claim is:

1. An electrical cable apparatus for service vehicles, comprising a hollow box, a pair of externally threaded sleeves and nut fasteners carried by said box for securing it to a panel of the service vehicle, a hingeable door carried by said box with handle and lock means for preventing unauthorized use of said apparatus, switch means carried by said box for rendering the electrical system of said service vehicle safe, spring loaded reels and cables carried within said box with clamp means for securing said cables to a stalled vehicle's battery, guide means and stop means for said cable carried within said box for restricting over-travel of said cables upon said reels, said externally threaded sleeves being carried within openings in the back wall of said box and through openings of the panel, flange means upon said sleeves abutting with said back wall when said nut fasteners are tightened upon said sleeves against a washer and the bore of said sleeves carrying said cables of said apparatus, said reels being spaced apart and carried on the interior of said box to rewind said cables thereupon by spring means within said reels after said stalled vehicle is started, one ends of said cables upon said reels passing through said hollow sleeves and being secured to the terminals of said service vehicle's battery, said service vehicle's battery providing the electrical booster power for starting said stalled vehicle when said stalled vehicle's battery is dead, the other ends of said cables being passed through fixed yokes and fitted with cable clamp not slideable through said yokes, and switch means wired in series with one of said cables of said apparatus providing protective means against short circuiting by someone tampering with said apparatus.

* * * * *